United States Patent [19]

Cole et al.

[11] Patent Number: 4,641,725
[45] Date of Patent: Feb. 10, 1987

[54] WIDE DYNAMIC RANGE HYDRAULIC VIBRATOR

[75] Inventors: Jack H. Cole; Delbert W. Fair, both of Ponca City, Okla.

[73] Assignee: Conoco Inc., Ponca City, Okla.

[21] Appl. No.: 644,487

[22] Filed: Aug. 27, 1984

[51] Int. Cl.[4] .......................... G01V 1/04; H04R 1/02; H04R 11/00; F01B 31/14

[52] U.S. Cl. .................................... 181/119; 367/143; 367/189; 92/2; 92/13.1

[58] Field of Search ................... 73/662, 665; 92/12.1, 92/13.3, 13.6, 13.8, 2, 13.1, 13.51; 181/113, 114, 119, 120, 121; 367/189, 190, 143

[56] References Cited

U.S. PATENT DOCUMENTS

| | | | |
|---|---|---|---|
| 356,538 | 1/1887 | Hubner | 92/13.6 |
| 2,222,819 | 11/1940 | Light | 92/13.6 |
| 3,422,926 | 1/1969 | Stanaway | 92/13.6 |
| 3,626,807 | 12/1971 | Shartzer | 92/13.6 X |
| 3,815,480 | 6/1974 | Spyra | 92/13.8 X |
| 3,905,279 | 9/1975 | Yadon | 92/13.8 |
| 3,978,884 | 9/1976 | Sundstrom | 92/13.6 X |
| 3,997,022 | 12/1976 | Cholet | 181/120 |
| 4,106,586 | 8/1978 | Stafford | 181/121 |
| 4,164,264 | 8/1979 | Fair | 181/119 |
| 4,388,981 | 6/1983 | Fair | 181/119 |
| 4,428,238 | 1/1984 | Tauscher | 73/665 |

*Primary Examiner*—Charles T. Jordan
*Assistant Examiner*—Brian S. Steinberger
*Attorney, Agent, or Firm*—Charles E. Quarton

[57] ABSTRACT

An apparatus for incremental cylinder length control in a hydraulic vibrator of the type having a reaction mass with a cylinder bore disposed therein, first and second end sleeves disposed in sealed movable position in the ends of the cylinder, a piston rod sealed and slidably disposed through the first and second sleeves with a piston attached to the piston rods where the improvement comprises threading the ends of the cylinder bore and forming mating threads on the first and second sleeves with means for rotating the sleeves with respect to the cylinder so that the sleeves move toward or away from the piston thereby reducing the volume of hydraulic oil between the end of the piston and the end sleeves.

6 Claims, 12 Drawing Figures

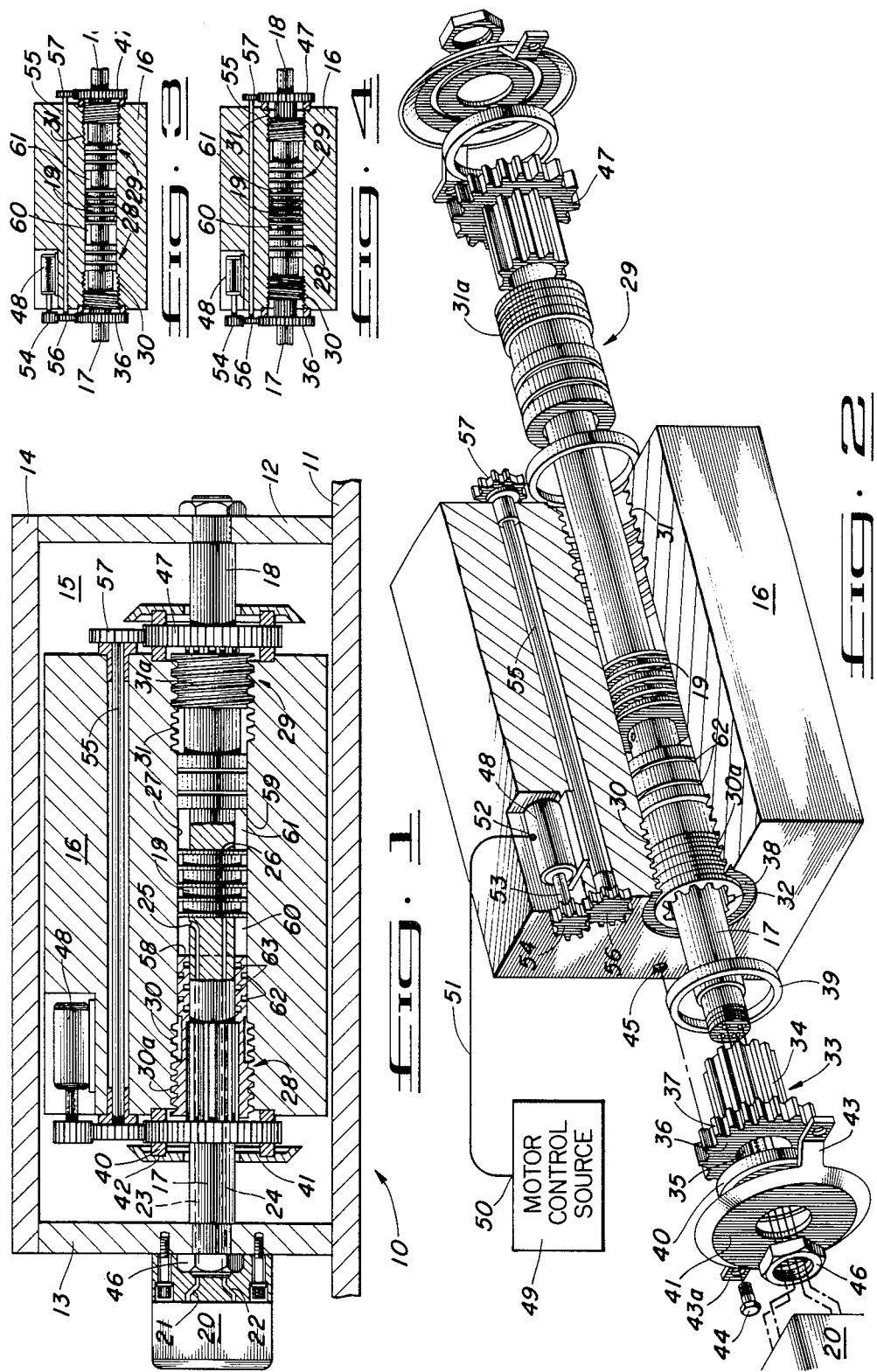

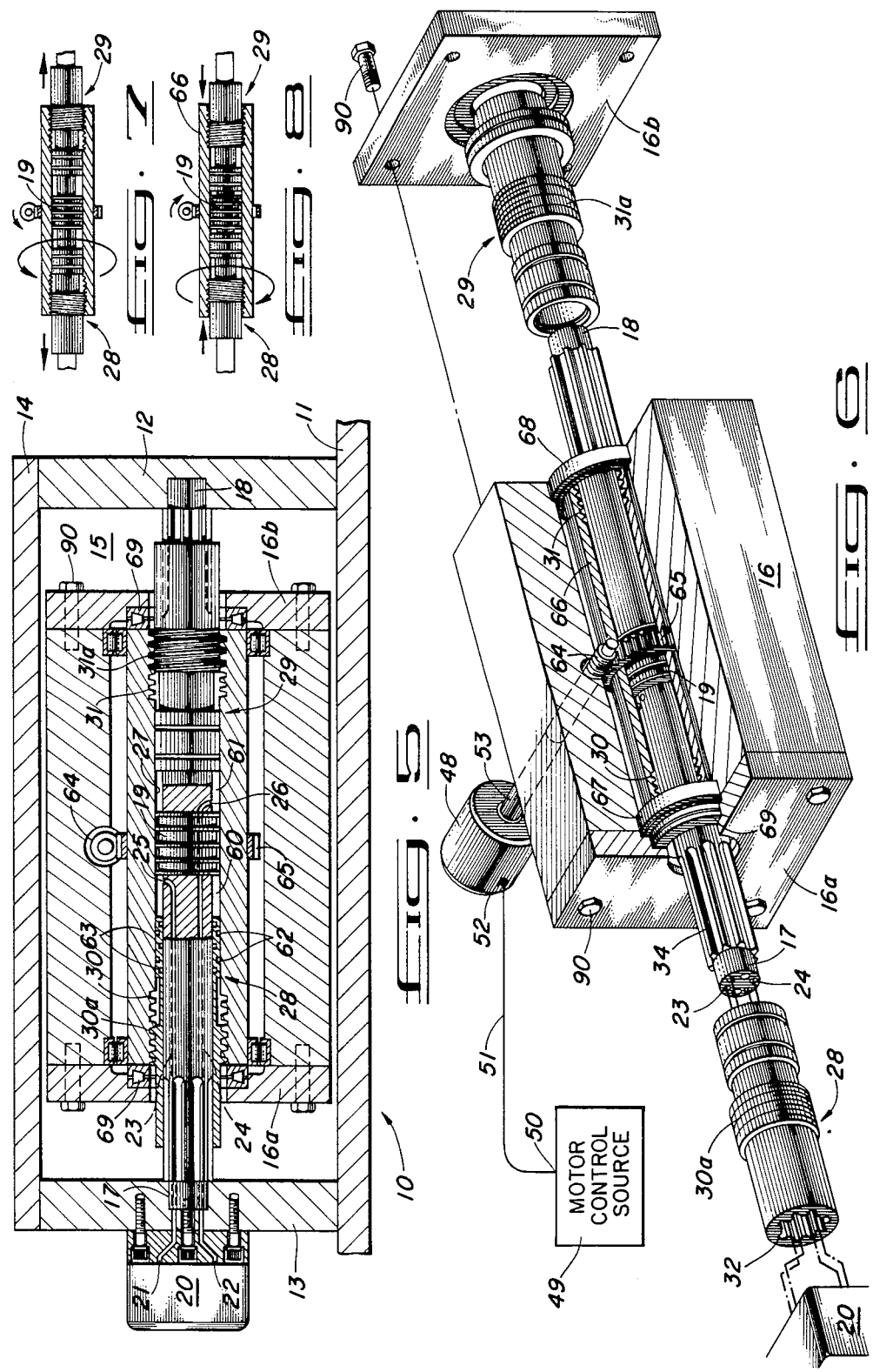

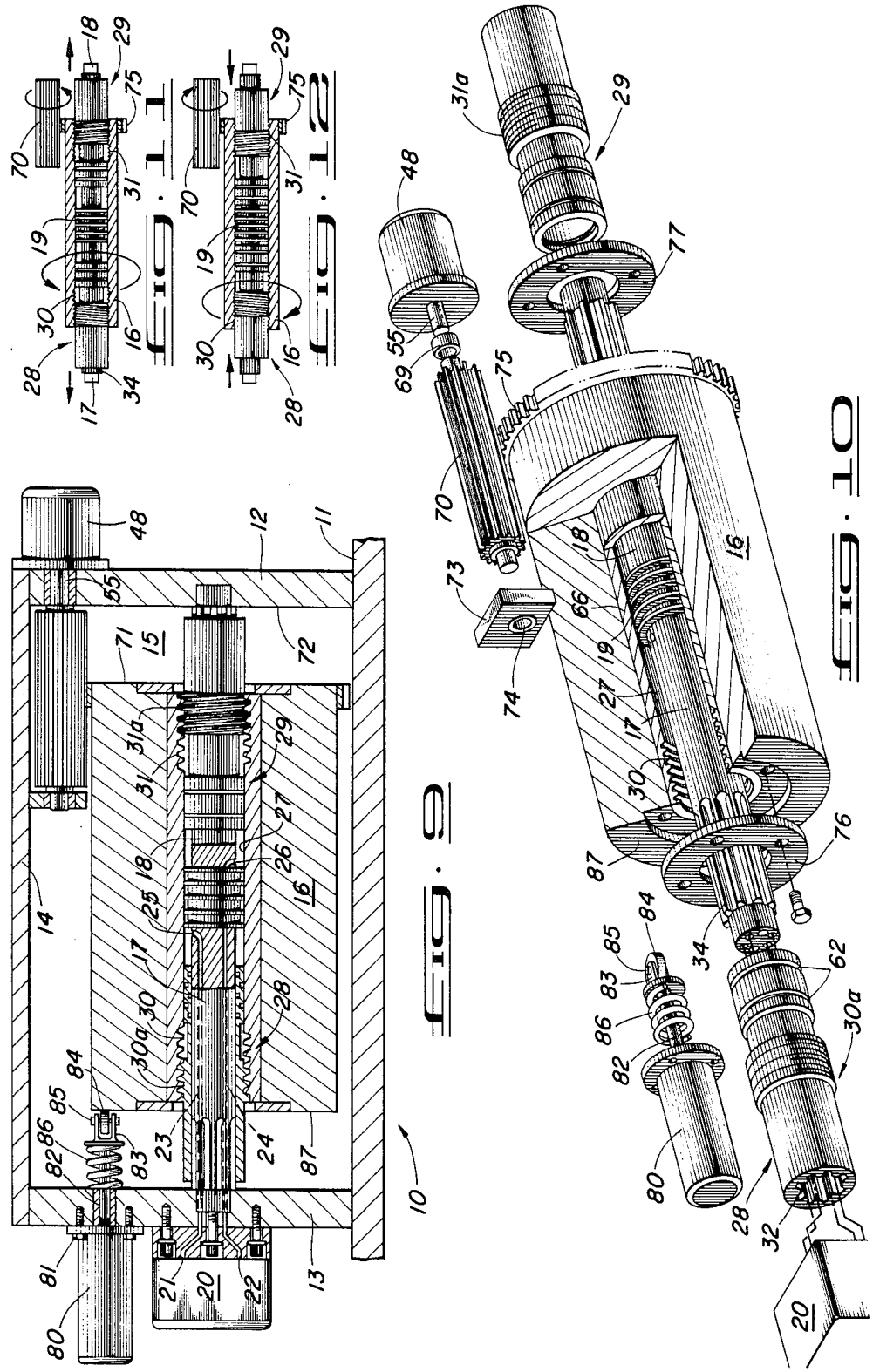

4,641,725

WIDE DYNAMIC RANGE HYDRAULIC VIBRATOR

BRIEF DESCRIPTION OF THE PRIOR ART

U.S. Pat. No. 4,106,586 to Stafford and U.S. Pat. No. 4,388,981 to Fair disclose means for improving a vibrator's high frequency performance by reducing the length of the hydraulic chamber between the ends of the piston and the end of the chamber, as the frequency is increased. The patent to Stafford has two fixed positions for the apparatus used to reduce the size of the hydraulic chamber. The first position which provides the largest reservoir is used for low frequency and the second position which provides the smallest reservoir is used for high frequency. The Fair patent has a control system which gradually reduces the size of the reservoir as the frequency is increased and vice versa.

BRIEF DESCRIPTION OF THE INVENTION

This invention deals with a method for gradually reducing the length of the cylinder thus increasing the dynamic stiffness as the frequency is increased by mechanically moving end sleeves toward the piston by means of threads formed in the cylinder wall and around the periphery of the end leeve. Apparatus is then provided to rotate the threads thus moving the end sleeves toward the piston as the frequency is increased and away from the piston as the frequency is decreased. In one embodiment the apparatus used to rotate the threads comprises a spline which fits into the end sleeve and is coupled to a gear. A motor coupled through a gear train rotates between the end sleeves in a manner to move the sleeves in unison toward or away from the piston. In a modified embodiment, the cylinder wall is rotated with the spline fixed around the piston rod. Rotation of the cylinder wall causes the end sleeves to move along the spline toward the piston or away from the piston depending upon the direction of rotation of the cylinder wall. Another embodiment rotates the mass rather than the cylinder wall. In all embodiments the dynamic stiffness is subsequently increased by mechanically locking the end sleeves for each incremental movement toward or away from the piston.

BRIEF DESCRIPTION OF THE FIGURES

FIG. 1 is a partial cross-sectional view of a hydraulic vibrator showing the sleeve shifting apparatus in full view;

FIG. 2 is a breakaway orthogonal projection taken in partial cross-section illustrating the various parts and their location with respect to each other;

FIGS. 3 and 4 illustrate the operation of the apparatus of FIGS. 1 and 2;

FIG. 5 is a cross-sectional view illustrating a modification of the apparatus shown in FIG. 1;

FIG. 6 is an orthogonal partial cross-sectional view of the vibrator with portions of the vibrator shown in full view;

FIGS. 7 and 8 illustrate the operation of the apparatus shown in FIGS. 5 and 6;

FIG. 9 is another modification of the apparatus illustrated in FIG. 1 where the mass is rotated rather than the cylinder wall;

FIG. 10 is an orthogonal view of the apparatus illustrated in FIG. 9 with a partial cross-section of the mass and cylinder wall and includes some elements separated to better illustrate the particular elements; and FIGS. 11 and 12 illustrate the operation of the apparatus of FIGS. 9 and 10.

DETAILED DESCRIPTION OF THE INVENTION

The same numbers will be used throughout the specification for the same parts.

Referring to FIGS. 1 through 4 but in particular to FIGS. 1 and 2, a vibrator generally referred to by arrow 10 is normally completely enclosed to prevent the entrance of dust and contaminant material. Such enclosure is formed by a base plate 11, side walls 12 and 13, a top 14, rear enclosure 15, and a front enclosure (not illustrated). Inside the enclosure above described is mounted a reaction mass 16 slidably mounted on piston rods 17 and 18 which are attached to a piston 19. Hydraulic fluid is communicated to each side of piston 19 by means of a control valve 20 which communicates fluid down ports 21 and 22 to hydraulic passages 23 and 24, respectively, where they exit at 25 and 26 to each side of piston 19. Opposite piston 19, which is mounted in a cylinder bore 27, are end sleeves generally referred to by arrows 28 and 29. The end sleeves 28 and 29 are threaded into the ends of cylinder bore 27 by means of threads 30 and 31 formed into cylindrical bore 27 and, in the preferred embodiment, are of opposite hand, that is, if thread 30 is right hand then thread 31 is left hand. The end sleeves 28 and 29, likewise, have mating threads 30a and 31a, respectively. Inside end sleeve 28 is formed female splines 32. Identical splines are formed in end sleeve 29 but are not shown. A second sleeve generally referred to by arrow 33 contains a plurality of male splines 34 (see FIG. 2). Second sleeve 33 has bore 35 of a diameter to slide over the piston rod. A drive gear 36 is attached coaxially to second sleeve 33 and has a plurality of gear teeth 37 formed around its periphery. On the end of mass 16 is a surface groove 38 sized to fit retaining bearing ring 39. A second retaining bearing ring 40 fits between gear 36 and retaining plate 41 and is, likewise, secured to retaining plate 41 by a groove 42 (see FIG. 1). Retaining plate 41 is secured to mass 16 by means of bracket 43 and 43a and screws 44 which are threaded into holes 45 in mass 16. A nut 46 secures piston rod 17 to side wall 13. End sleeve 29 has the identical assembly described with end sleeve 28; therefore, these individual elements will not be further described except that threads 31a and 31, as previously described, have opposite hands in the preferred embodiment.

The driving means, which rotates gear 36 and end sleeve 28 and a gear 47 and end sleeve 29, comprises a stepper motor 48, for example, which is controlled electrically by a motor control source 49 which has an output 50 through wire bundle 51 to the input 52 of motor 48. Motor 48 has a mechanical output 53 comprising a shaft which is axially coupled to gear 54. The output from gear 54 is connected to a control assembly comprising a shaft 55 which has a gear 56 on one end which mates with gears 54 and 36 and a gear 57 on the other end which mates with gear 47. End sleeve 28 has an end 58 facing piston 19 while end sleeve 29 has an end 59 facing piston 19. Between ends 58 and piston 19 is a hydraulic chamber 60 and between end 59 and piston 19 is a second hydraulic chamber 61. Both end sleeves 28 and 29 contain necessary seals 62 and 63 to prevent hydraulic fluid in chamber 60 from bypassing end sleeve 28. End sleeve 29, likewise, has the same seals as does end sleeve 28. These seals are not shown in detail.

OPERATION

Referring to FIGS. 3 and 4 along with FIGS. 1 and 2, under normal operation conditions hydraulic fluid is supplied to control valve 20. Hydraulic fluid will then be supplied under pressure to ports 21 or 22 so that hydraulic fluid will then pass down 23, for example, out port 25 and into hydraulic chamber 60. Fluid will be exhausted from second hydraulic chamber 61 into port 26 through hydraulic passage 24 to port 22 through control valve 20 to a sump. Such operation is well known in the art and will not be discussed in detail.

As hydraulic fluid is applied alternately to each side of piston 19, force is applied to end walls 12 and 13 and subsequently to base plate 11 causing force of controlled frequency to be applied to the ground or surface being contacted by base plate 11. As previously mentioned, as the frequency increases, if chanber 60 and 61 remain the same size, then the dynamic stiffness remains the same at the higher frequencies. Since the natural resonance which determines the band width must be increased when the frequency is increased if a wide frequency range vibrator is to be made possible, then some of the volume of oil in each side of the piston 19 must be removed by changing the length of the cylinder. Movement of end sleeves 28 and 29 will accomplish the above, however, the sleeve must also be mechanically locked in order to increase the dynamic stiffness of the entire system. In order to accomplish the reduction during the increase in frequency and vice versa, motor 48 is provided with electrical input through wire 51 to input 52 of motor 48 which rotates shaft 53 either clockwise or counterclockwise by an amount necessary to accomplish the reduction or expansion of chamber 60 and 61. If, for example, gear 54 rotates in a clockwise direction facing the gear, then gear 56 will rotate in a counterclockwise rotation along with shaft 55 and gear 57. Gear 36 will then rotate in a clockwise direction. If thread 30 is a right-handed thread, end sleeve 28 will move toward piston 19. Gear 47 will be rotating counterclockwise causing end sleeve 29 to, likewise, move toward piston 19, since thread 31 is left hand. The threads 30 and mating threads 30a, and threads 31 and mating threads 31a, mechanically lock end sleeves 28 and 29, respectively, so that the dynamic stiffness is increased as end sleeves 28 and 29 move toward piston 19. Such movement will begin as illustrated in FIG. 3 and terminate as illustrated in FIG. 4 with end sleeves 28 and 29 moving in close proximity to the ends of piston 19. Rotating gear 54 in the counterclockwise direction will cause gear 56 to rotate in a clockwise direction and gear 36 to rotate in a counterclockwise direction causing end sleeve 28 to move away from piston 19, since shaft 55 will be rotating in a clockwise direction facing gear 57. Gear 57 will be rotating in a counterclockwise direction and gear 47 will be rotating in a clockwise direction, since thread 31 is left hand. Then sleeve 29 will move away from piston 19. FIG. 4 illustrates the starting position and FIG. 3 illustrates the final movement illustrated above.

Retaining rings 39 and 40 act as a bearing for a gear 36 and as a retaining means for gear 36 since the assembly is secured in place by retaining plate 41 and brackets 43 with bolts 44 anchoring the assembly to mass 16.

Referring to FIGS. 5 through 8 a modified embodiment of the apparatus described in FIGS. 1 through 4 is illustrated. In this embodiment the principle of operation remains the same as that described in FIGS. 1 through 4; however, the means for moving sleeves 28 and 29 are different. In this embodiment motor 48 is coupled through shaft 53 to a worm gear 64 which couples to mating gear 65. Gear 65 is mounted to a cylinder 66 which is journaled in mass 16 through bearings 67 and 68. Seals 62 and 63 (see FIG. 1) prevent escape of hydraulic fluid from the assembly. Cylinder 66 is constrained axially by thrust bearings 69 and 70.

In the embodiment of FIGS. 1 through 4, spline 34 was mounted on the sleeve assembly 33.

In the embodiment as illustrated in FIGS. 5 and 6 spline 34 is mounted directly on shaft 17 with the female spline 32 mounted inside sleeve 28 as was the case in FIGS. 1 and 2. The bearings 67, 68, 69, and 70 are retained in mass 16 by end plates 16a and 16b. Plates 16a and 16b are secured by bolts 90.

The remainder of the apparatus is identical to that disclosed in FIGS. 1 and 2 and will not be further discussed.

The operation of the device is best understood by referring to FIGS. 7 and 8 along with FIGS. 5 and 6. A signal from motor control source 49 is communicated through output 50 to wire bundle 51 and inputted at 52 to motor 48. Shaft 53 will then rotate in accordance with the polarity of the signal being inputted into motor 48. That is, one polarity will cause the motor to turn clockwise and the opposite polarity will cause the motor to turn counterclockwise. When shaft 53 rotates worm gear 64 will, likewise, rotate with mating gear 65 moving cylinder 66 either in counterclockwise direction as illustrated in FIG. 7 which will then move sleeve 28 outwardly away from piston 19 or, as illustrated in FIG. 8, counterclockwise rotation of cylinder 66 will cause end sleeves 28 and 29 to move toward piston 19. Worm gear 64 is shown coupled to a single mating gear 65. It is obvious that shaft 53 could be extended and coupled to a second worm gear 64 and a second mating worm gear 65 for a second cylinder 66. Thus the apparatus disclosed in the embodiment would function equally well for side-by-side cylinders as illustrated in U.S. Pat. No. 4,143,736.

A further modification similar in operation to the previous embodiment illustrated in FIGS. 5 through 8 is illustrated in FIGS. 9 through 12. In this embodiment rather than the internal cylinder 66 being rotated, motor 48 is coupled through shaft 55 and bearing 69 to an elongated gear 70. The length of gear 70 is determined by the face 71 and the inner face 72 of side 12. Since the mass 16 tends to stay still, the base plate 11 and side 12 will tend to move away from or toward face 71. The total movement required, as previously described, will determine the total length of gear 70. Gear 70 is attached to top 14 by a bracket 73 and bearing 74. Gear 70 mates with a circumferential gear 75 mounted around mass 16.

The remainder of the assembly, end plates 28, threads 30a and 30, and splines 32 and 34 are identical to that described in FIGS. 5 through 8. The cylinder 66, however, rather than being attached by bearings 67, 68, 69, and 70, is attached rigidly to mass 16. The entire assembly is retained in mass 16 by end plates 76 and 77. Seals may be provided where necessary but are not specifically illustrated.

OPERATION

Referring to FIGS. 11 and 12 in addition to FIGS. 9 and 10, the operation of this embodiment will be described.

Viewing FIGS. 11 and 12 in the direction of arrow 78, clockwise rotation of gear 70 is illustrated in FIG. 11 and will cause a counterclockwise rotation of gear 75 which will also result in a counterclockwise rotation of mass 16. The counterclockwise rotation of mass 16 will cause threads 30 and 31 to move end sleeves 28 and 29 away from piston 19 in the direction of the arrow.

Referring to FIG. 12, the opposite rotation of gear 70 will cause clockwise rotation of mass 16, causing threads 30 and 31 to move end sleeves 28 and 29 toward piston 19. It should be remembered that end sleeves 28 or 29 will not rotate with the rotation of mass 16, since the end sleeves are locked from rotation by splines 34 and 32. Thus the end sleeves can only physically move toward or away from piston 19 regardless of the rotation of mass 16. If the position of mass 16 with respect to base plate 10 is desired, then a LVDT (linear variable differential transformer) can be mounted to measure the movement. Usually the LVDT comprises a probe mounted on side wall 13 or 12 and extends into mass 16. This LVDT is well known and illustrated in many patents and shown in those patents already referenced. In the embodiment shown in FIGS. 9 through 12; however, mass 16 will be rotated. Under these conditions the LVDT cannot extend into mass 16 to provide a LVDT feedback to the computer which controls valve 20. A LVDT 80 is attached by means of bolts 81 to an end plate 13, for example. It is obvious that it could have just as well been attached to end plate 12. A shaft 82 extends out of LVDT 80 to a U-shaped bracket 83. A roller 84 is attached through an axial 85 to bracket 83. A spring 86 biases bracket 83 continually against mass 16. Spring 86 has sufficient tension to maintain contact with the side 87 of mass 16 at all times regardless of the total excursion of mass 16 or the frequency of oscillation of side wall 13. The rollers 84 will accommodate any axial rotation of mass 16, thus continually providing information for feedback purposes to the control system.

It is obvious that other mechanical arrangements can be used to move end sleeves 28 and 29, such as cams or levers, or a combination of both with or without the above-mentioned threads 30, 30a, and 31, 31a.

Motor 48 has been described as a d.c. motor which rotates in a direction determined by polarity. It is obvious that a.c. motors can be used which can be controlled by phase. Synchronous motors can also be used and hydraulic motors can be used. All of the above would be controlled by appropriate control systems which are within the state of the art.

It is obvious that changes can be made in the application and still be within the spirit and scope of the invention as disclosed in the specification and appended claims.

What is claimed is:

1. Apparatus for incremental cylinder length control in a hydraulic vibrator having a reaction mass with a cylinder bore disposed therein, said cylinder bore having first and second ends, first and second end sleeve means disposed in sealed movable position in each of said first and second ends of said cylinder bore, respectively, piston rod means sealed and slidably disposed through said first and second end sleeve means and including a piston disposed in said cylinder bore attached to said piston rod means, said incremental cylinder length control comprising:

first and second thread means formed in each of said first and second ends of said cylinder bore and extending toward said piston;

mating thread means formed in said first and second end sleeve means for moving said end sleeve means toward or away from said piston means upon relative rotation between said thread means and said mating thread means; and drive means for providing relative rotation of said first and second thread means and said mating thread means, relative rotation of said first and second threaded means and said mating threaded means in one direction moving said end sleeve means toward said piston and opposite direction rotation moving said end sleeve means away from said piston;

said drive means including motor means having an output for generating a rotative force to move said end sleeves in response to change in a vibration frequency of the reaction mass with respect to said piston.

2. Apparatus as described in claim 1 wherein said drive means for providing relative rotation of said first and second thread means and said mating thread means comprises:

motor control source means coupled to said motor means for controlling the output of said motor means; and gear means coupled to the output of said motor means, said gear means coupled to said first and second end sleeve means, whereby rotation of motor means in one direction will cause said end sleeve means to rotate about said first and second thread means and said mating thread means thereby moving said end sleeve means away from said piston and vice versa.

3. Apparatus as described in claim 2 wherein said gear means comprises:

a gear mounted on the output of said motor means;

a shaft extending parallel to the axis of said cylinder bore and through said mass and having a gear on each end of said shaft, one of said gears coupled to said gear attached to the output of said motor means; and first and second gear means mating with said gears attached to said shaft, said first and second gear means coupled to spline means extending into mating spline means in said end sleeve means, whereby rotation of said motor means will cause rotation of said gear attached to said motor means and rotation of said gear attached to said shaft, said gears causing rotation of said first and second means extending into said end sleeve means, thereby causing rotation of said end sleeve means.

4. Apparatus as described in claim 1 wherein said drive means for providing relative rotation of said first and second thread means and said mating thread means comprises:

worm gear means coupled to an output shaft of said motor means;

means for rotatably mounting said cylinder bore in said reaction mass;

gear means mounted around the periphery of said means for rotatably mounting said cylinder bore and said gear means mating with said worm gear means; and spline means formed on said shaft means with mating spline means formed in said end sleeve means whereby rotation of said motor means causes rotation of said shaft and corresponding rotation of said worm gear means, rotation of said worm gear means causes rotation of said gear means thereby causing corresponding rotation in said means for rotatably mounting said cylinder bore, rotation of said means for rotatably mounting said cylinder bore causes said first and second thread means and said mating thread means to move said end sleeve means along said spline means and said mating spline means toward or away from said piston, depending on the direction of rotation of said shaft.

5. Apparatus as described in claim 4 wherein said means for rotatably mounting said cylinder bore comprises:
   a cylinder containing said cylinder bore therein; and
   bearing means secured between said cylinder and said reaction mass and wherein said gear means is mounted around the circumference of said cylinder.

6. Apparatus as described in claim 1 wherein said drive means for providing relative rotation of said first and second thread means and said mating thread means comprises:
   a shaft coupled to the output of said motor means and an elongated gear means;
   a peripheral gear mounted around said reaction mass and coupled to said elongated gear means;
   spline means formed in said first and second piston rod means; and
   mating spline means formed in said end sleeve means whereby rotation of said shaft causes corresponding rotation of said elongated gear means, said peripheral gear means around said reaction mass being rotated by said elongated gear means resulting in said first and second end sleeve means moving along said spline means and said mating spline means toward or away from said piston means as said first and second thread means and said mating thread means are rotated with respect to each other.

* * * * *